T. M. DANIELS.
HAT PIN.
APPLICATION FILED JAN. 18, 1911.
1,027,375.
Patented May 21, 1912.
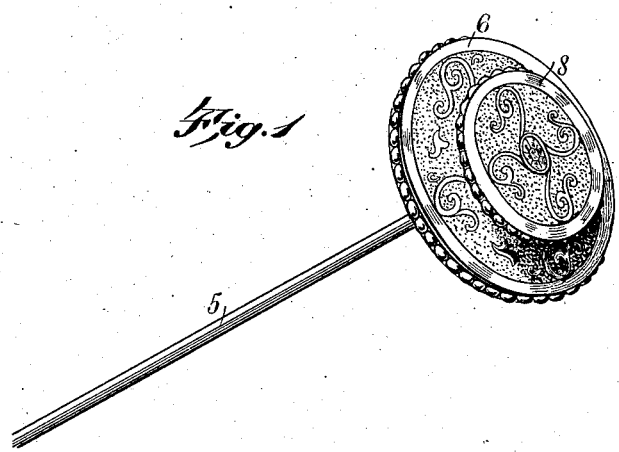
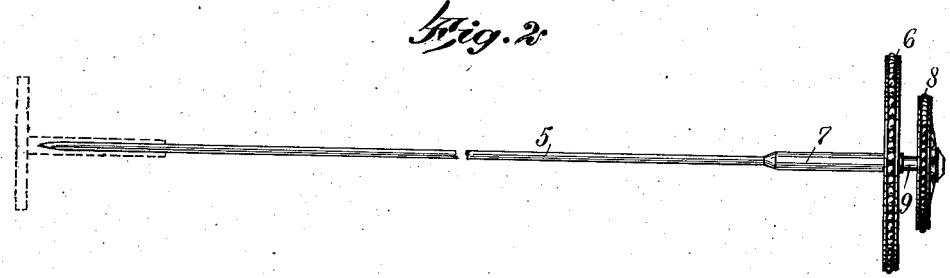
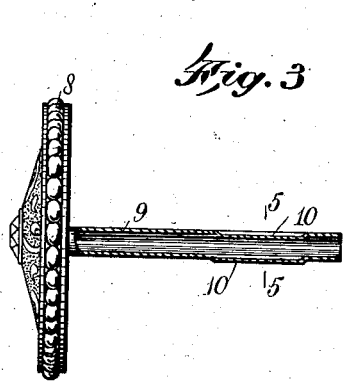
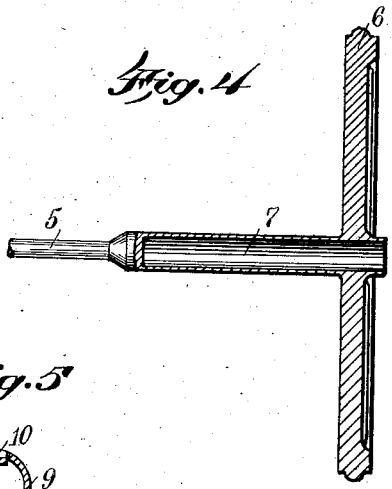
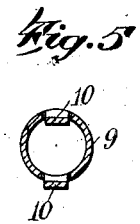
WITNESSES:
INVENTOR
Thomas M. Daniels
BY
ATTORNEYS

UNITED STATES PATENT OFFICE.

THOMAS M. DANIELS, OF CHICAGO, ILLINOIS.

HAT-PIN.

1,027,375.  Specification of Letters Patent.  Patented May 21, 1912.

Application filed January 18, 1911. Serial No. 603,258.

*To all whom it may concern:*

Be it known that I, THOMAS M. DANIELS, a citizen of the United States, and a resident of Chicago, in the county of Cook and State of Illinois, have invented a new and Improved Hat-Pin, of which the following is a full, clear, and exact description.

The invention is an improvement in hat-pins which are provided with guards to prevent injury to persons within close proximity.

A material check to the general adoption of guards for hat-pins is the fact that the guard when removed is often misplaced and cannot be found when wanted. This is due to the fact that no means is provided to keep the pin and the guard assembled when the pin is being drawn from and passed into the hat, the guard being generally removed and placed where it is often forgotten and lost. With my invention these objections are overcome by providing the head of the hat-pin with a guard holder and a guard both adapted to be received and held on the holder and fit over and shield the point of the pin.

Reference is to be had to the accompanying drawings forming a part of this specification, in which similar characters of reference indicate corresponding parts in all the figures.

Figure 1 is a perspective view of the head portion of a hat-pin constructed in accordance with my invention, the guard being shown assembled with the head as when not in use; Fig. 2 is a side view of the pin showing the guard in the position shown in Fig. 1 in full lines and in dotted outline in position of use on the point of the pin; Fig. 3 is a side view of the guard showing the tubular stem in longitudinal section; Fig. 4 is a similar sectional view of the head of the pin; and Fig. 5 is a cross section on the line 5—5 of Fig. 3.

The hat-pin 5 is of the customary construction except that at the head 6 the body of the pin for a short distance is slightly larger in diameter and provided with a socket 7 the socket being extended to the outer edge of the head. A guard for the point of the pin comprises a head 8 and a tubular stem or shank 9, the head 8 ordinarily, though not necessarily, being of slightly less diameter than the head 6, and both heads being of any desired ornamentation. At an intermediate point of the tubular shank the same is slitted longitudinally to form any desired number of tongues 10, and these tongues are pressed inwardly and outwardly in alternate order as clearly shown in Figs. 3 and 5. The inwardly pressed tongue or tongues when the guard is applied to the point of the pin frictionally bind on the pin and hold the guard against accidental displacement. When the tubular stem of the guard is inserted in socket 7 of the head, the outwardly pressed tongues 10 likewise bind within the socket and hold the two parts assembled as shown in Figs. 1 and 2. By thus constructing the guard so as to be applicable to both the point of the pin and the socket, the guard can be worn as a part of the pin even when it is not used to serve its proper function; also immediately after the guard is withdrawn from the point of the pin preparatory to withdrawing the latter in removing the hat, the guard can be assembled with the pin and thus prevented from being lost.

Having thus described my invention, I claim as new and desire to secure by Letters Patent:

1. A hat pin having a head provided with a socket, and a hat pin guard having a tubular stem adapted to be passed within the socket and also to fit over the point of the pin and having outwardly and inwardly spring-pressed tongues, one of which is adapted to bind within the socket and the other on the pin.

2. A hat pin having a head provided with a socket, a hat pin guard having a tubular stem for engagement within the socket, the stem being also adapted to fit over the point of the pin, the said stem having a longitudinally extending spring tongue which is pressed inwardly within the said socket whereby when the stem is fitted over the point of the pin it will be held in position.

3. A hat pin having a head provided with a socket, a hat pin guard having a tubular stem for engagement within the socket and also adapted to fit over the point of the pin, the said stem being provided with spring tongues, one of which is pressed outwardly whereby when the stem is inserted in the socket of the said head it will be firmly held therein.

In testimony whereof I have signed my name to this specification in the presence of two subscribing witnesses.

THOMAS M. DANIELS.

Witnesses:
JESSE E. ROBERTS,
K. M. MAYER.

Copies of this patent may be obtained for five cents each, by addressing the "Commissioner of Patents, Washington, D. C."